March 13, 1962

E. P. G. WRIGHT ET AL

3,024,993

INTELLIGENCE STORAGE EQUIPMENT

Filed June 16, 1954

*Inventors*
E. P. G. WRIGHT · J. RICE

By Robert Harding Jr.
*Attorney*

United States Patent Office 3,024,993
Patented Mar. 13, 1962

3,024,993
INTELLIGENCE STORAGE EQUIPMENT
Esmond Philip Goodwin Wright and Joseph Rice, London, England, assignors to International Standard Electric Corporation, New York, N.Y.
Filed June 16, 1954, Ser. No. 437,176
Claims priority, application Great Britain June 19, 1953
13 Claims. (Cl. 235—176)

The present invention relates to intelligence storage equipment.

In such equipment it is often necessary to modify the contents of a particular section of a store. This modification could, for example, be the insertion of intelligence into that section, the performance of a calculation on intelligence already in that section, or the extraction of the intelligence from that section.

According to the present invention there is provided:

Intelligence storage equipment, comprising a first store which provides a number of independent storage sections of equal capacity in each of which a word may be stored and in which the contents of said store are maintained in circulation, reading and recording means associated with said store, a second store having the same storage capacity as one of said storage sections in which a word can be stored and in which the contents of said second store are maintained in circulation, reading and recording means associated with said second store, the arrangement being such that each time the contents of said second store commence to be in operative relation with the reading means thereof the contents of a different one of the storage sections of the first store commence to be in operative relation with the reading means thereof, means for selecting a storage section of said first store, and means under control of said selecting means and responsive to said selected storage section commencing to be in operative relation with the reading means thereof to cause the modification of the contents of said selected storage section in accordance with the contents of said second store.

According to the present invention there is further provided:

Intelligence storage equipment, comprising a first endless magnetic track on which intelligence can be stored and which provides a number of independent storage sections of equal capacity in each of which a word may be stored, first reading and recording means associated with said track, a second endless magnetic track on which a single word can be stored, second reading and recording means associated with said second track, an interconnection between said second reading and recording means, whereby a word stored on said second track may be maintained in circulation in the path including said second reading means, said interconnection, said second recording means and said second track, each recording of the stored word being at a different position on said track, the arrangement being such that each time the contents of the second track commences to be read by said second reading means the contents of a different one of the storage sections of the first track commences to be in operative relation with the reading means thereof, means for selecting one of the storage sections of said first track, and means under control of said selecting means and responsive to a selected storage section of said first track commencing to be in operative relation with the reading means thereof to cause the modification of the contents of one of the stores then in operative relation with its reading means under control of the contents of the other of the stores then in operative relation with its reading means.

The term "word" as used in the above statement and in the claims means an ordered set of characters having a meaning and considered as a unit. A typical example of a word is a binary number.

It will be appreciated that there may be a plurality of first stores and of second stores suitably inter-related.

This invention will now be described with reference to the accompanying drawings, in which.

GENERAL DESCRIPTION

There are two storage systems described, one using pattern movement registers, and the other using endless magnetic tracks. In either case there is a first store which is subdivided into a number $x$ of individual storage sections. Each of these storage sections has $(n+1)$ element positions and can store a binary number having up to $(n-1)$ digits, with the $n$th element position used for a sign digit (see below). The extra digital space provides a blank space between two sections, which allows time for switching operations.

The system which has been described is a computing arrangement for industrial purpose in which each section is used for, say, a separate inventory. Other uses are possible for equipment embodying the present invention. In such a system, it is necessary to be able to insert a number into an "empty" section, to extract a recorded number from a section, and to modify a recorded number. In the present system the only modifications which will be described are the addition of a number to a recorded number, and the subtraction of a number from a recorded number. Other modifications, such as modifications involving multiplication or division, could be provided if needed.

Thus the operations needed in the present system involve:

(a) selecting a particular storage section.
(b) adding to or subtracting a new number from the number stored therein.
(c) replacing the amended number in a desired storage section, which may be the section from which the unamended number came.

In normal circumstances the intelligence in the main store is caused to progress repeatedly past a read out point.

Associated with the first store there is a second store or auxiliary store which can accommodate up to $(n+1)$ intelligence elements, i.e. it is equal in capacity to one section of the main store. In the computer art the first or main store would be called a multi-word store and the second or auxiliary store would be called a one-word store. The intelligence in the auxiliary store, if any, is caused, like that in the main store, to progress repeatedly past a read-out point.

The stores are so controlled that as the first element in the auxiliary store is at its read-out point, the first element of a section of the main store is at its read-out point. Each time the word in the auxiliary store is circulated its beginning coincides with the beginning of a section of the main store. Hence on each cycle of the auxiliary store the intelligence therein is passing the read-out point in step with the number in a different section of the main store.

The read-out points form outputs from the stores which go to an adder which can be caused to add the two numbers together or to subtract one from the other. The resulting output goes to a read-in point for either the auxiliary store or the main store.

The operation will now be described on the assumption that a number in section A of the main store is to be added to a number in section B of the main store, and the result of the addition is to insert in section C of the main store.

First the number in section A is transferred to the auxiliary store by selecting section A for read-out to the auxiliary store. Next section B is selected. When section B reaches the read-out point, the number therein and the number in the auxiliary store are both read out and applied to the adder. This adds them together, and applies the result to the auxiliary store.

Next section C of the main store is selected, and while that section is passing the read-in point the number in the auxiliary store is transferred to the main store. It should be noted that this section C could be section A or B if required. In this case the result of the calculation would be applied to section B directly. Where section C is not section B, the result has to be inserted in the auxiliary store. However, if the result of the calculation is to be inserted in section A, the insertion would occur during a subsequent cycle of operation. If several main stores are used, the auxiliary store can be associated with any one of these by a switching and controlling arrangement for enabling any one of these main stores.

Thus it will be seen that the fundamental principle of the system is that the auxiliary store is repeatedly "offered" to all sections of the main store, but the operational cycle for a modification of the contents of a section of the main store or of the auxiliary store is initiated when it is being offered to a selected section of the main store.

It will be appreciated that the intelligence relating to sections A, B or C may be obtained from, or placed in stores unconnected with the main store and for such operation the auxiliary store needs no timing control.

*Circuit Conventions*

Before describing the circuit diagrams some explanation of the conventions used therein is required.

Electronic gates, well known per se, are shown as circles with incoming controls shown as radial leads with arrow-heads touching the circle. Outputs are shown as radial leads with arrow-heads pointing radially outwards. The number inside the circle indicates the total number of incoming controls which must be energized for the gate to deliver an output.

Figure 3:
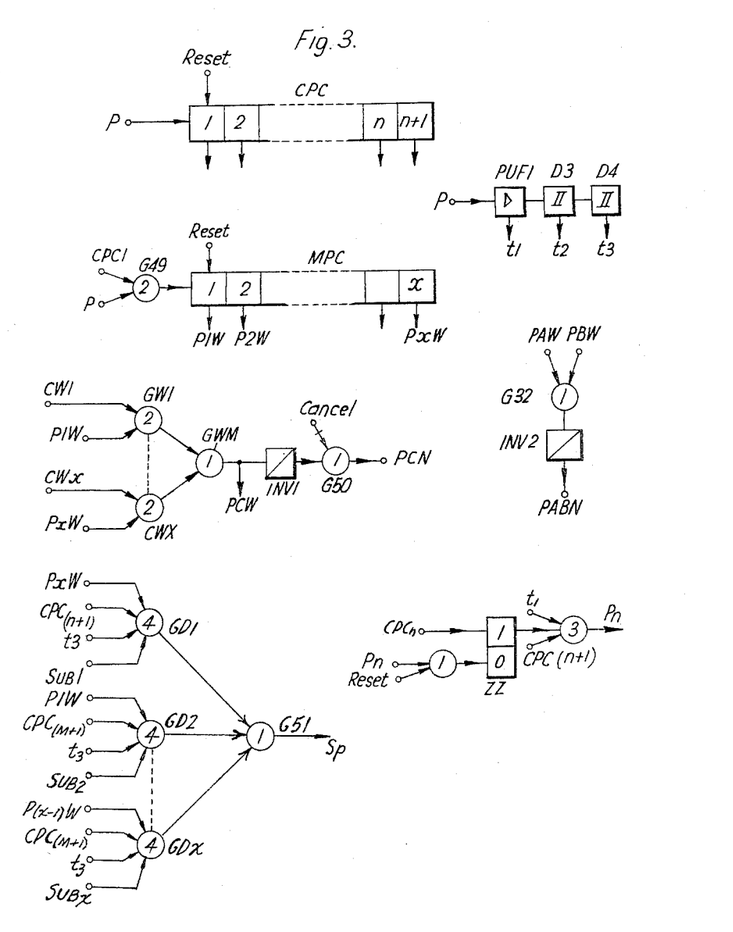
FIG. 3 shows circuits for producing from a pulse source of known type the pulses and waveforms which are used to control the circuit operation.

When the short line is drawn across a control lead, as in the case of the Cancel control for G50 in FIG. 3, it means that when that control is energized the gate cannot deliver an output however many of its other controls are energized. The energisation of such a control may be said to inhibit the gate of which it forms a part. Gates are given references beginning with the letter G.

A linear array of spaced rectangles connected together by a line along their midpoints represents a pattern movement register, each rectangle representing one stage of the register.

A counter comprising a number of single-component stages each of which is capable of assuming one of two conditions, on or off, is shown as a series of adjacent rectangles drawn in linear array, e.g. CPC, FIG. 3. The counters shown count to the end of their cycle and then restart from their first positions.

A bistable circuit or flip-flop is shown as two adjacent rectangles, and like a counter it only has one stage operated at once. In either case, if another stage (the other stage in a bistable circuit) is switched on, this automatically switches the first stage off. Such circuits are well-known.

The above devices are indicated by the main reference R for a pattern movement register, and F for a bistable circuit. The units of pattern movement registers and of counters are numbered 1, 2, 3 . . . , while the units of bistable circuits are numbered 1 and 0.

If all the bistable and other circuit outputs were connected to all of the gates which they control there would be a complex network of leads which would be difficult to follow. Therefore these leads have been omitted, and the short control leads to the gates have been given references with small letters. Thus bistable circuit F1 can energise either lead $f1.1$ or lead $f1.0$, the first digit indicating which unit is energising the lead.

Any other conventions which need to be described will be dealt with when they are encountered.

*The Waveforms*

FIG. 3 shows schematically how certain of the control waveforms used in the circuits shown are produced. Their production will be described in tabular form.

*Add.*—This is positive when addition is to be performed and zero at other times.

*Subtract.*—This is positive when subtraction is to be performed and zero at other times.

Figure 4:
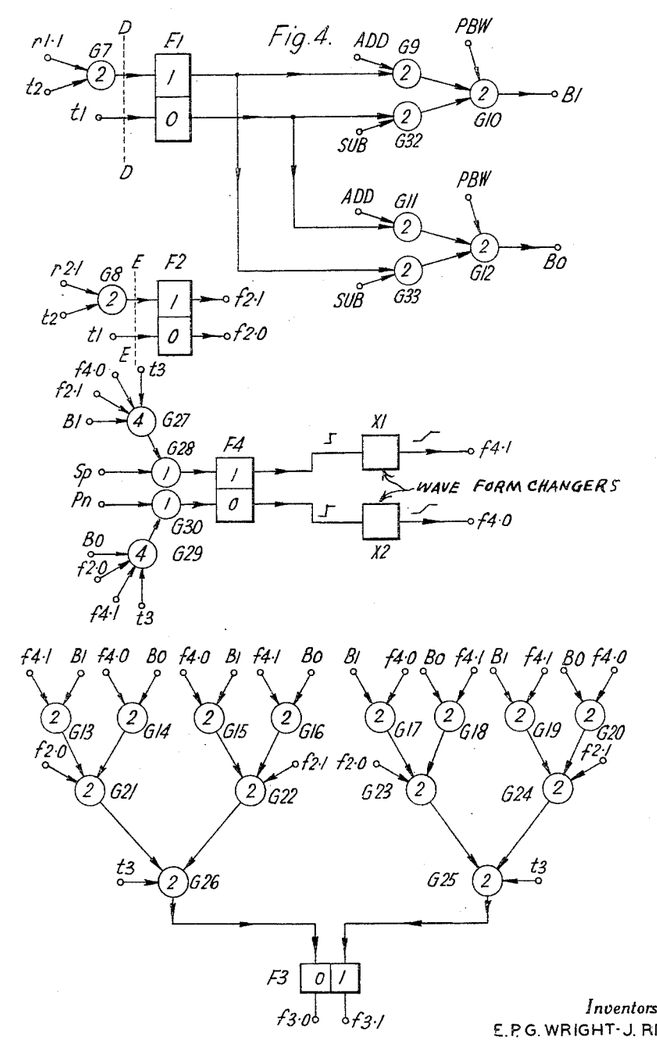
FIG. 4 shows equipment for adding to or subtracting from a number in the main store a number stored in the auxiliary store. This circuit would be used in conjunction with either FIG. 1 or FIG. 2.

The production of these controls is not described because when an operation is to be performed the appropriate Add or Subtract terminals in FIG. 4 are energised in well-known manner from a programme of instructions for the equipment.

The following discussion assumes that an intelligence item stored in a section designated A of the main store is to be used to modify the contents of a section designated B of the main store.

The circuits of FIG. 3 include a clock pulse counter CPC having $(n+1)$ units, there being $(n+1)$ elements in each section of the main store. The auxiliary store also has $(n+1)$ elements. Thus CPC1 gives an output which corresponds to the first element of each of these stores, as will be described. This is controlled by pulses from a source P.

When the stores are pattern movement registers, P pulses come from a standard pulse generator, and where an endless magnetic track on the periphery of a rotatable drum is used, these pulses come from the drum or disc itself. The surface of the drum or disc bears an additional track known as the clock track on which there is a "mark" recording aligned with the element positions of all tracks. These pulses control all operations via CPC which supplies an output for the duration of each element.

The second counter shown in FIG. 3 is the marker counter MPC, which as $x$ units, one per section of the main store. This has an output corresponding with each section of the store, and is fed via gate G49. This has two controls, one being CPC1, the first output from counter CPC, and the other being from the P source. When an endless magnetic track is used, the input to G49 marked P is from a second track known as the marker track which has a recording aligned with the first element position of each section.

To ensure that the clock and marker counters are kept in step with the main store they are provided with reset connections which are energised when the first element of the first section is at the read-out point. For the drum or disc this is done by an additional recording on the marker track following the usual marker recording for the first section, which on each cycle resets MPC.

To return to a list of the waveforms:

PAW is positive while the intelligence stored in section A is passing the read-out point.

PBW is positive while the intelligence stored in section B is passing the read-out point. These waveforms are obtained by gate arrangements, not shown but similar to those used to produce PCW, controlled from the programme of instructions. There is a different one for each section of the main store.

PCW is positive while the section of the main store in which the amended intelligence is to be placed is passing the read-out point. This section could be section A or B if desired.

When a section passes the read-out point it also passes the read-in point, and read-out and read-in can occur on one passage as will be described.

PCW is produced by energising one of terminals CW1 to CWX, which form controls for gates GW1 to GWX respectively. Each of these gates also has a control which is energised by an output of MPC, e.g. P1W for GW1. Hence when the marker pulse counter MPC energises its output for the desired section C, potential is applied via one of gates GW1—GWX to a mixer gate GWM. This decouples all of gates GW1—GWX from each other, and its output goes to an inverter INV1, shown as a diagonally-bisected rectangle. The energization of the appropriate CW terminal is determined by the programme, which determines which storage section is to be selected, and hence which CW terminal is to be energized.

The inverted output is used to form the waveform PCN, which is merely PCW inverted, and which can be disabled when the control Cancel to gate G50 is energised.

PABN is a positive waveform while PAW and PBW are zero, but zero when either is positive. It is produced by an inverter INV2 fed by gate G32 whose controls are PAW and PBW.

PWW is a positive waveform lasting for one word time and present when new intelligence is to be inserted. It is generated when required by a circuit (not shown) which is similar to that used for generating PCW, and is also controlled by the program.

To produce the $t1$, $t2$, $t3$ pulses, which are used as will be described later, the pulses P from the pulse source are fed to a pulse former PUF1 which produces an output pulse $t1$ whose width is approximately a third of that of P. The $t1$ pulses are fed to a delay circuit D3 to give a second pulse $t2$ which follows $t1$; this in turn is fed to a delay circuit D4 to give $t3$. Hence from each P pulse there is derived a series of three staggered pulses $t1$, $t2$, $t3$.

The only parts of FIG. 3 which have not been described are the $Sp$ and $Pn$ circuits, which will be described later.

*Pattern Movement Register Stores (FIG. 1)*

Figure 1:
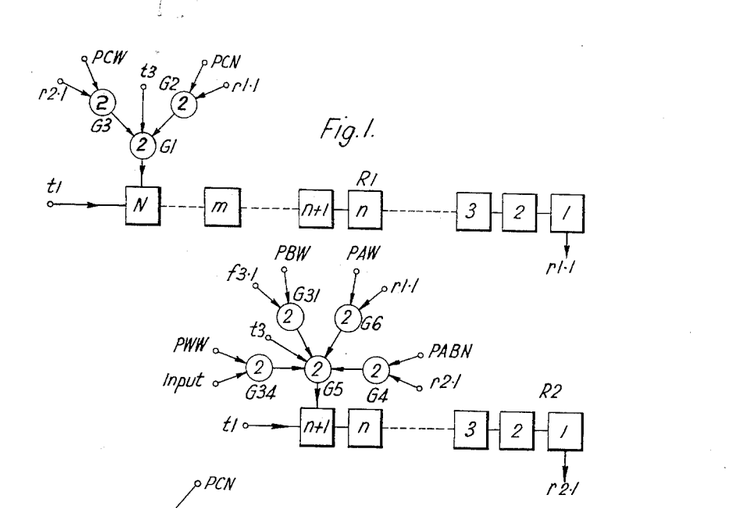
FIG. 1 shows a pattern movement register forming a main store, and the associated shorter pattern movement register forming an auxiliary store.

The main store is a pattern movement register R1 having $N = x\ (n+1)$ elements. This register may be a pattern movement register using a single cold-cathode gas-filled discharge tube per stage, such as shown in U.S. Patent No. 2,649,502, issued to A. D. Odell on August 18, 1953. Other sorts of pattern movement registers, also known as shift registers, may obviously be used.

Of $t1$, $t2$ and $t3$, $t1$ is used to step the pattern of stored intelligence, and insertion of intelligence into R1 occurs at $t3$, since gate G1 includes $t3$ among its controls. The other controls are from G2 and G3, and since it will be remembered that only one of PCW and PCN can be positive at any one time, only one of G2 and G3 can give an output at any one time. G2 is controlled by PCN and $r1.1$, the output from unit 1 of R1, and is the recirculation gate for use when the intelligence is being circulated without change. G3 is controlled by PCW and $r2.1$. This enables intelligence to be transferred to R1 from R2, which will be described next.

R2 is the auxiliary or one word store already referred to. Like R1 it is stepped at $t1$, and like R1 it receives new intelligence via its input gate G5 at $t3$. The other controls for G5 are from gates G4, which is the recirculation gate for R2, under control at PABN; G6 which is the transfer gate for transfer from R1, under control at PAW; G31, which is the input gate for the result of the addition, being controlled by PBW and $f3.1$; and G34, which is the gate used to insert new intelligence under control of PWW.

*Magnetic Track Store (FIG. 2)*

Figure 2:
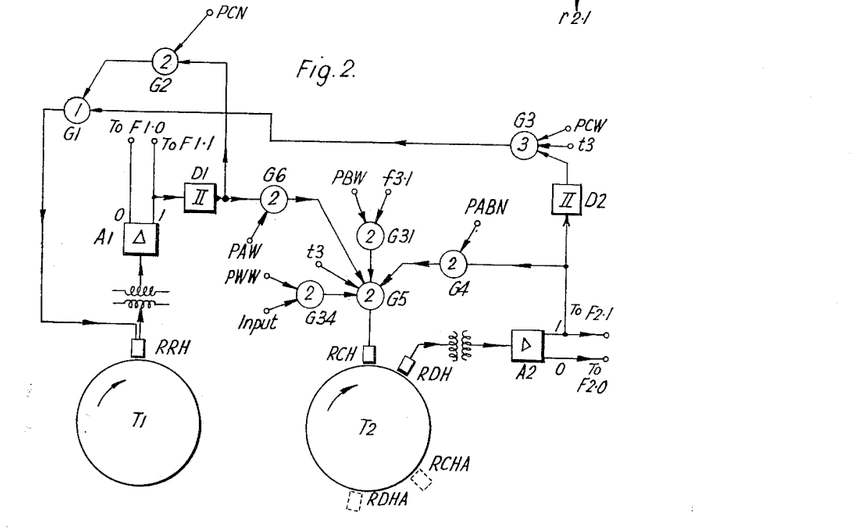
FIG. 2 shows schematically an arrangement in which both the main store and the auxiliary store are formed by circumferential magnetic tracks on the periphery of a rotatable drum.

This uses two endless magnetic tracks on the periphery of a rotatable drum. As has already been described, additional tracks are used to supply the clock and marker pulses. The pulses $t1$, $t2$, $t3$ already described are, of course, used in conjunction with this arrangement.

The main or multi-word store is formed by the track T1 with which is associated a read/record head RRH.

The output read from the track is applied to an amplifier A1 of well-known type which gives a positive output on its output lead 1 and earth on lead 0 when 1 is read and vice-versa when 0 is read. The two output leads extend to the read flip-flop F1 (FIG. 4). The 1 output from A1 is applied via a delay circuit D1 to a gate G6 whose other control is PAW. This is used to transfer a number from T1 to the auxiliary store.

During normal revolutions of the magnetic drum the intelligence recorded thereon is not affected. Although RRH is reading data all the time, this has no effect in the transfer circuit between T1 and T2, because normally G6 is closed as its control PAW is normally inoperative. As will be seen from the subsequent description, although a flip-flop F1 in FIG. 4 follows the data read by RRH, this normally has no effect. It would, of course be possible to disable the output from RRH when reading therefrom is not needed, if this were considered desirable. However, in the present arrangement it is quite unnecessary. In this condition, i.e. when no operations are in progress, there is no recording, so that the data on T1 is not altered. This is because the control PCW for gate G3 is normally closed.

The auxiliary or one word store is formed by the track T2, on which there are a recording head RCH and a reading head RDH. The distance between these heads is equal to the number of element positions $(n+1)$ in one storage section. Further, when the first element position of a storage section on T1 is under RRH, the first element position is being read by RDH. The output from RDH goes via amplifier A2, which is of the same type as A1, to the recirculation gate G4. When the waveform PABN occurs, G4 passes what RDH has read to G5. Here it is applied to the recording head RCH under control of $t3$.

The other gates controlling G5 are G31, controlled by PBW and $f3.1$ via which the result of a computation is applied to RCH; G6, controlled by PAW and the D1 output, which is the transfer gate from T1; and G34, controlled by PWW, via which new numbers are inserted. It should be noted that the record head RCH always records 0 unless it is stimulated to record 1.

The output from A2 is also applied via a delay circuit D2 which is similar to D1 to gate G3, whose other controls are PCW and $t3$. This ensures that intelligence to be transferred from T2 to T1 reaches T1 with the correct timing. This is the T2 to T1 transfer gate.

Hence it will be seen that during normal operation any intelligence read by RDH passes via the recirculation path A2—D2—G4—G5—RCH back to the track, so that a number stored on T2 will thus normally be continuously circulating on this path. As its first element is read by RDH, the first element position of one of the storage sections of T1 is being read by RRH. The number in T2 is therefore repeatedly recorded, and so is successively "offered" to all storage sections on T1. Hence the auxiliary store is really formed by RCH, RDH, the recirculation path detailed above, and the ever-changing recording surface which is between RCH and RDH.

Other pairs of heads, such as recording head RCHA and reading head RDHA, dotted in FIG. 2 can be provided, and it can easily be seen that each pair of heads can function completely independently of any other set of heads, so that on the same cycle a number of modifications can be performed.

All that remains to be considered in FIG. 2 is the delay circuits D1 and D2. With a continuously moving recording medium, such as a magnetic drum, it is necessary to compensate for this movement. Thus, reading occurs at the beginning of an element position but recording occurs at the end. During this period the drum will have moved, so delay circuits are introduced to bring the recording to a correct placing on the drum surface. The so called phase-modulation technique is preferably used in this case. In this, a recorded element has its first half magnetically saturated one way and its second half magnetically saturated the other way. This has the result that the midpoint has a change in direction of magnetisation, the direction of the change indicating what is recorded. This facilitates the use of a compound read/record head.

At this point it is desirable to point out that a variety of other storage systems are known, any one of which could be adopted for use in a system according to the invention. Examples are acoustic delay lines, such as the mercury delay line and the so-called magnetostrictive delay line, cathode ray tube storage devices, and ferroelectric and ferromagnetic matrices.

*Amending Operation (FIG. 4)*

As has been stated above, when no amending operation is being performed, PCN is positive and PCW negative, so that the intelligence stored in the main store R1 or T1 is in continuous circulation. This circulation has already been described. The flip-flop F1 follows the information recorded in R1: if the element read from R1.1 is one, then the coincidence of $r1.1$ and $t2$ energised opens G7 to set F1 to F1.1. In the case of the drum shown in FIG. 2, the components to the left of the line D—D are omitted, F1 being directly controlled from A1. In the pattern movement register circuit, $t1$ steps R1 and restores F1 to F1.0 if it was set at F1.1.

PABN is positive during normal recirculation since neither PAW nor PBW is present, as already described, and so any intelligence in R2 or T2 is similarly circulating, as described above, and the output of R2.1 controls F2 via G8. Hence also $t1$ steps the pattern and resets F2 to F2.0. In the case of the drum shown in FIG. 2 the components to the left of the line E—E are omitted, F2 being directly controlled from A2. When recirculation is in progress the outputs of F1 and F2 have no effect. Any changes which they might produce are irrelevant since gate G31 (FIG. 1 or 2) is closed as PBW is not positive at this time.

It will be assumed that an amending is to be performed, and that this amending is the addition of a number in section A of the main store to a number in section B of the main store. The sum is to be inserted in section C of the main store. As has been mentioned already, section C could be section A or section B if desired.

The controls for gates G9 and G11 which are marked ADD are therefore energised under control of the programme. Then it is necessary to extract A from R1 or T1. This is done by causing the waveform PAW to be applied to gate G6, the main store—auxiliary store transfer gate. As mentioned in the general description, PAW is positive while section A is passing the main store read-out point. Hence this number A is transferred to and stored in R2, or T2. As has been described, number A will now appear at the auxiliary store read-out point in synchronism with all numbers in the main store. Thus it is successively offered to all of those numbers.

Next the waveform PBW is generated, and it opens G10 and G12 in FIG. 4 and G31 in FIG. 1 or 2. Hence while section B is being read, numbers are read out of both the stores, and F1 follows B and F2 follows A to control the addition.

The normal or rest state is with F3 set to F3.0 and F4 set to F4.0 operated. This can be ensured by reset means of well-known type. As has already been indicated, numbers A and B are received from the auxiliary and main stores respectively in synchronism, with the least significant digits received first. Towards the end of each digit the $t3$ pulse is applied to gates G27 and G29 associated with F4, and to G26 and G25 associated with F3. For the purpose of the present explanation it is assumed that the circuit is to perform the operation $7+5$, i.e. $A=7$ and $B=5$. These numbers will be received from the store as 000111 (i.e. 7) and as 000101 (i.e. 5). As will be described later, this assumes that the numbers each have five binary digits, the sixth digital place being reserved for a sign digit (i.e. it is assumed that $n=6$). In this case both numbers are positive, so the sign digit, the $n$th digit, is 0.

It will be seen that both digits in the first, i.e. least significant, digital place are ones, so flip-flops F1 and F2 have $f1.1$ and $f2.1$ energised. Since $f1.1$ is energised, gates G9 and G10 open in series and B1 is energised. Inspection of the gates controlling F3 shows that of the gates connected to the input of F3.1 only G17 can give an output since its controls B1 and $f4.0$ are both energised. However, this has no effect since it allows only one of the controls to G23 to be energised because $f2.0$ is not energised. Hence F3.1 is unaffected. Consideration of the gates controlling F3.0 shows that G15 has both its controls energised and so energises its output, which forms one control for G22. As the lead $f2.1$ is energised, G22 has two controls energised simultaneously and so delivers an output. This energises a control of G26, which therefore delivers an output to F3.0 when the $t3$ pulse for the digital place occurs. As F3.0 is already operated, this has no effect, so F3 is left with F3.0 operated and its output $f3.0$ energised. Since $f3.1$ is not energised, the gate G31 (FIG. 1 or 2) passes no output, so the recording head RCH records a 0.

It is necessary now to consider the "carry" flip-flop F4. Gate G27 has all four of its controls energised when the $t3$ pulse occurs, since $f2.1$ and B1 are both positive and F4.0 is operated and hence energising its output $f4.0$ via the waveform changer X2. Gate G27 therefore delivers an output pulse which operates F4.1 via G28. Therefore, F4.0 assumes its non-energised condition. The output from F4.1 is a sudden change of voltage to a positive level, and the rise of voltage is delayed by X1 so that it does not reach a value sufficient to operate a gate until after the P pulse ends. Hence the "carry" condition is generated—output $f4.1$ from X1 energised—in time for the next received pair of digits. These waveform changers are shown as rectangles with the input and output waveforms adjacent thereto.

Thus the first pair of digits has left F3 set at F3.0 and has set F4 to F4.1 with its output energised effectively after a slight delay.

When the next pair of digits arrive, they energise leads $f2.1$ and B0 positively. The digit from the main store causes G11 to open as both of its controls are energised, which energises B0 via G12.

The computation for this digital place is $1+0+1$ (from "carry") which gives an answer of 0 and carry 1. F3 will now be considered. The "carry" condition left $f4.1$ energised, as described. Considering F3.0 first, it will be seen that G16 has both its controls energised, and as $f2.1$ is at positive, G22 and G26 operate in series. This finds F3 at F3.0 and so has no effect. Of the gates controlling F3.1, G18 has both its controls energised, but this is ineffective as $f2.0$ is at zero so that G23 cannot operate. Hence F3 remains at F3.0 and 0 is again recorded. Turning now to F4, it will be seen that neither G27 nor G29 has all controls energised, and so again F4 is left at F4.1. Hence we have again "written" the answer of 0 and carried 1.

For the third digital place both $f2.1$ and B1 are energised, and $f4.1$ is energised by the "carry" as described. Considering the gates for F3.0 it will be seen that B1 and $f4.1$ causes G13 to deliver an output, but this has no effect as $f2.0$ is not energised, so that G21 does not deliver an output. Turning to the gates for F3.1, it will be seen that G19 has both inputs energised from B1 and $f4.1$, and so delivers an output. As $f2.1$ is also energised, G24 delivers an output to G25. When the $t3$ pulse occurs, G25 therefore delivers an output to operate F3.1 and render F3.0 unoperated. This means that $f3.1$ is now energised, indicating that the answer has 1 in its third place. Hence 1 is recorded in the auxiliary store.

It is necessary now to consider F4. Again neither G27 nor G29 has all controls energised, so F4 is unaffected and still indicates that one is to be carried.

In the next digital place, $f2.0$ and B0 are both energised, and $f4.1$ is energised. Therefore gates G18 and G16 both deliver outputs, but as $f2.0$ is energised, only G23 of the next stage of gates can deliver an output. The $t3$ pulse therefore causes G25 to deliver an output. As F3 is already at F3.1 this leaves it unaltered, and again 1 is recorded. G29 controlling F4.0 has all controls energised and so causes F4 to restore to F4.0 via G30. This removes the $f4.1$ output and energises $f4.0$ after the usual delay.

For the next, the fifth digital place, we have $f2.0$, B0 and $f4.0$ energised, so F4 is unaffected, but F3 is set to F3.0 via G14, G21 and G26. Hence 0 is recorded.

The next digital place in the example being examined is the sign digit, and as both numbers are positive $f2.0$ and B0 are both energised. Again it will be seen that F3 and F4 are not altered. Hence the answer is 001100, i.e. +12. This is clearly the correct answer.

The $Pn$ pulse previously mentioned occurs during the $(n+1)$th element position, and restores F4 to F4.0, if not already in that condition.

The purpose of this is to ensure positively that F4 is always reset to its 0 state before a new section is dealt with.

To generate $Pn$, ZZ1 of flip-flop ZZ (FIG. 3) is set to its 1 state by $CPCn$, i.e. during each sign digit, and the gate controlled therefrom, whose other controls are $t1$ and CPC $(n+1)$, then gives an output. Thus the output $Pn$ occurs during $CPC(n+1)$, i.e. immediately before the beginning of a new storage section read or record time. The pulse $Pn$ is itself used, via the input gate to ZZ0, to reset ZZ to its ZZ0 condition.

$Pn$ is, as explained in this passage, intended to ensure that F4 is always correctly set to F4.0 after the sequence of operations. In the case of subtraction, F4 must be at F4.1 at the commencement of a sequence, and so the $Sp$ pulse is generated, when called for, after $Pn$. In this case it would be possible to cancel $Pn$ when $Sp$ is needed, but it is simpler to cause $Sp$ to occur when needed after $Pn$, as is done in the present case.

It is to be noted that if a number in a certain section of the main store is to be amended by adding a new number to it, the new number is placed in the auxiliary store under the control of a waveform PWW. Then PAW is dispensed with and PBW is generated to coincide with the section the number in which is to be amended.

Returning to the operation being described, the result of the addition is that the contents of the main store are unaltered, while the sum $A+B$ is now held in the auxiliary store. The contents of both stores are now circulated, $(A+B)$ being thus successively offered to all sections of the main store until its intended destination reaches the read-in point of the main store. Waveform PCW then occurs, and opens G3 and G1 in series (G3 only, in the arrangement of FIG. 2), so that $A+B$ is now inserted into R1 or T1, as the case may be. At the ends of PCW the operation has concluded, and although the auxiliary store still holds $(A+B)$ this is of no consequence, since no further transfer can occur until a new arithmetic operation is to take place. An obvious variant of this system would be for the result of the addition to be inserted into the section of the main store which has been called the B section. This would merely involve an input gate controlled by $f3.1$—PBW for G1 in FIG. 1. In the case of FIG. 2 it would involve a gate corresponding to G1 between G3 and RRH which passes the output from G3 when the latter acts as a transfer gate, but which could be so controlled that the output from F3 reaches RRH instead of that from G3 when the result of the addition is to be inserted directly into T1.

Since the sum $(A+B)$ is still in the auxiliary store, it can be used for further amendment, or the transfer back to the main store cancelled until further amendments are effected, e.g. adding $(A+B)$ to what is in another section of the main store. Suitable application of the control waveforms ensures this.

If the number in the second store is to be used to amend the contents of a plurality of storage sections of the first store, these could all be selected by the selection gates in which case the selected storage sections would be dealt with one at a time. In this case the result of the modification would be placed in the storage section of the first store.

*Subtraction*

In this case the leads SUB to G32 and G33 are energised so that the output of F1.1 passes via G33 and G12 to B0 and that of F1.0 via G32 and G10 to B1. Hence the binary ones and noughts are interchanged. The "fugitive one" which must be added is attended to by producing pulse $Sp$ which initially sets F4 at F4.1, giving an initial carry to the first digital place.

FIG. 3 shows how $Sp$ is produced. It is produced in the $(n+1)$th position of the storage section immediately preceding that which holds the minuend, so that the carry flip-flop F4 is set to its 1 or carry condition just in time to carry 1 to the first digital place of the subtraction. In the next element time, therefore, the adder receives the subtrahend and the complemented minuend, and thus the carry induced by the initial setting of F4 to F4.1 gives the "fugitive one." To ensure that $Sp$ occurs at the correct time, it is produced by one of the gates GD, each of which is assigned to one of the main storage sections, and is controlled by the MPC output for the main storage section immediately preceding thereto, the CPC output $CPC(n+1)$, $t3$, and the SUB lead for the section holding the minuend. For example, if the minuend is in storage section 7, the input SUB7 to GD7 (not shown) is energised from the program. The MPC input for this gate is P6W, and so GD7 gives an output when the controls SUB7, P6W, $CPC(n+1)$ and $t$ are all energized, i.e. just before section 7 commences to be read. When one of the GD gate (in the example just mentioned, GD7), gives an output, the "mixing" gate G51 opens to give the $Sp$ pulse, which sets F4 as described. Since the $Sp$ pulse is generated at $t3$, i.e. after $t1$, of $CPC(n+1)$ it will be seen that when it occurs it cancels the effect of $Pn$, i.e. that it sets F4 to F4.1 in spite of the previous occurrence of $Pn$.

The circuit now functions as for normal addition. The sign digit of 1 in the $(n+1)$th place will, of course, disappear if the result is positive.

The $Pn$ pulse restores F4 to the F4.0 after the carry has taken place at the $(n+1)$th position of a section. The circuit for producing this pulse is shown at the lower right hand corner of FIG. 3. It comprises a flip-flop circuit ZZ which is normally in its ZZ0 position, having been set there by a reset pulse. When the $Sp$ pulse appears, ZZ goes to position ZZ1. If the counter CPC is at $(n+1)$th position the gate connected to ZZ1 opens to produce the pulse. The P$n$ pulse also drives ZZ to ZZ0 again.

General

The drawings shown assume that there is only one main store, but evidently any number may be used, the only addition required being switching gates so that intelligence can be passed to or from any main store. The second intelligence, under control of PBW, could come from a different store.

Insertion of Intelligence in the Main Store

Initial insertion into the main store is performed by inserting the intelligence initially into the auxiliary store via G34, under control of PWW, whereafter a PCW waveform is produced for the section for which the intelligence is intended. In fact, insertion in this manner is another use of the broad principle of the invention, i.e. the intelligence is successively offered to all sections until its destination is reached, whereafter the transfer is effected. Similarly, intelligence can be extracted in the same way via the auxiliary store.

Figure 5:
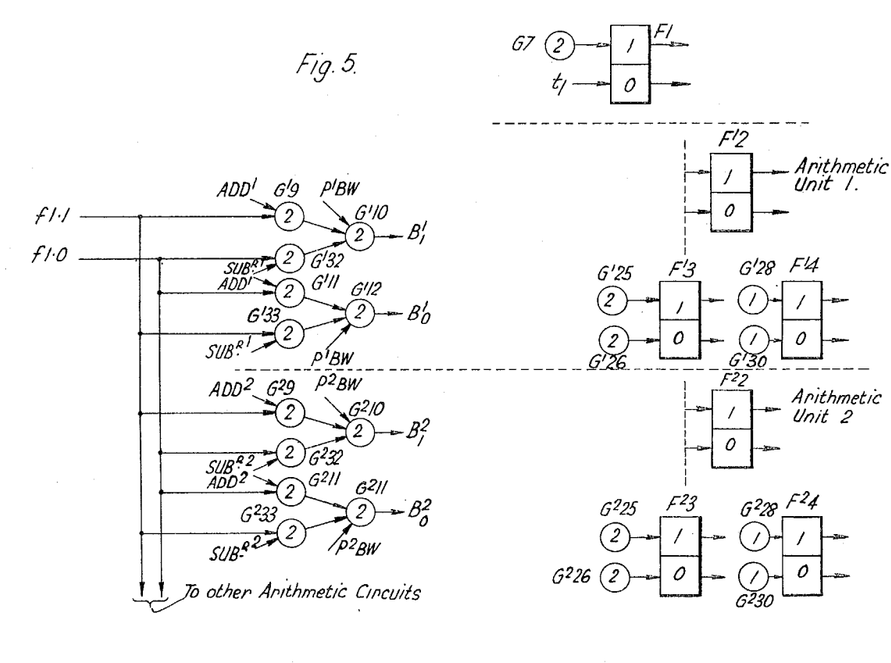
FIG. 5 shows a modification to the circuit to permit simultaneous arithmetic operations.

Modification to Permit Simultaneous Arithmetic Operation (FIG. 5)

The main store is common to a number of arithmetic circuits of which two have been schematically shown. Each arithmetic unit has its own set of control waveforms, and so can operate independent of any other unit. Reading off and recording are performed as already described.

Although not shown in FIG. 5 to avoid unduly complicating the figure, each arithmetic unit has its own auxiliary store, and the main store has a separate input gate fed from each auxiliary store, i.e. duplicated G3 gates.

Care must be taken of course that the arithmetic units do not try to simultaneously amend the same section of the main store. This would necessitate a lock out circuit which ensures that, while intelligence from one auxiliary store is being used, intelligence stored in other auxiliary stores can only be recirculated therein, i.e. that intelligence can only be read out of one auxiliary store at once. Where the stores are tracks on a magnetic drum, several auxiliary stores can be provided on the same track, as indicated in FIG. 2, in which case it is clear that these auxiliary stores are offered to the same section of the main store at different times.

Figure 6:
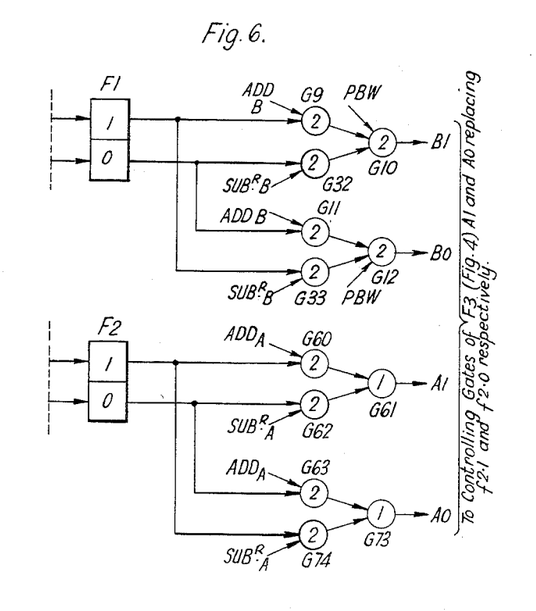
FIG. 6 shows a modification which permits a reduction of the time required for arithmetic operation.

Modifications to Save Time (FIG. 6)

The purpose of this will be apparent from the following examples. Consider that the number in section 3 of the main store is to be subtracted from that in section 1. As has been described, the contents of section 1 are passed to the auxiliary store under control of P1W, followed by subtraction under control of P3W while section 3 passes the read in and out points. Hence the subtraction would be carried out in less than one cycle of the main store. However, had it been necessary to subtract the number in section 1 from that in section 3, it would have been necessary to transfer the number from section 3, under control of P3W, to the auxiliary store and do the subtraction under control of P1W on the next cycle of the main store. If the main store has a large number of sections, they might make an undesirably large increase in the operational time.

To overcome this disadvantage, the number in section 1 is read into the auxiliary store by P1W as usual, and the subtraction performed "the right way round" as P3W occurs. This is effected by providing both F1 and F2 with a set of gates G9–10–32 and G11–12–33 and G60–G61–G62 and G63–G73–G74 for complementing the diminuend. The set of gates from F1 are unaltered, while those from F2 are similar to those from F1. With this arrangement, when PBW is applied, the subtract gates G62 and G74 from F2 are opened, and the add gates G60 and G63 closed, while the add gates G9 and G11 from F1 are opened and the subtract gates G32 and G33 are closed.

It will be noted that the gates G61 and G73 of F2 do not need a control corresponding to PBW which is needed for G10 and G11, since the auxiliary store can only hold one item which is always involved in the operations.

While the principles of the invention have been described above in connection with specific embodiments, and particular modifications thereof, it is to be clearly understood that this description is made only by way of example and not as a limitation on the scope of the invention.

What we claim is:

1. Intelligence storage equipment, comprising a first storage means having a capacity for the storage of groups of signals representing a number of independent words, there being a separate storage section for each group, first reading means for successively reading the groups of signals stored in said first storage means, first recording means for successively recording groups of signals representing words in said first storage means, first circulating means connected between said first reading means and said first recording means for repeatedly causing each group of signals representing a word read by said first reading means to be immediately rerecorded, signal-by-signal, in said first storage means by said first recording means in their proper order and in the same portion of said first storage means in which they were originally recorded, a second storage means having a storage section for each storage section of said first storage means but having a capacity for the storage of only one group of signals representing a word, second reading means for reading the signals stored in said second storing means, a second recording means for said second storage means, second circulating means including amplifying and gating means only connected between said second reading means and said second recording means for causing a group of signals representing a word read by said second reading means to be rerecorded in the next succeeding section of said second storage means by said second recording means, control means connected to both said circulating means for causing said first and second reading means to read groups of signals representing words simultaneously, a means for selecting a particular section of said first storage means, and means under control of said selecting means and connected to both said circulating means and responsive to the initiation of the reading operation of said first reading means in reading the group of signals in said selected section for altering the operation of one of said circulating means to modify the signals of the group read by the associated reading means in accordance with the signals read by the other reading means.

2. Equipment, as claimed in claim 1, in which the groups of signals representing words which are stored represent numbers expressed in binary digital notation, and in which the modification comprises an arithmetic operation performed on one number under control of another number.

3. Intelligence storage equipment, as claimed in claim 1, in which the first and second storage means comprises first and second pattern movement registers, and in which each circulating means comprises a gating means responsive to the operation of the control means.

4. Intelligence storage equipment, as claimed in claim 1, further comprising means responsive to the altering means to record the result of the modification in the section of the storage means associated with the circulating means whose operation is altered.

5. Intelligence storage equipment, as defined in claim 1, in which the circulating means which is altered by the altering means is the first circulating means, said equipment further comprising means for controlling the first recording means to record signals representing the modified value of the word in the selected section of the first storage means.

6. Intelligence storage equipment, as claimed in claim 1, in which the selecting means is arranged to select a plurality of the stored groups of signals and in which the represented value of each of said selected group is modified under control of the group of signals read from the second store.

7. Intelligence storage equipment, as claimed in claim 1, in which the first storage means is an endless magnetic track which provides a number of separate storage sections in each of which a group of signals representing a word can be stored, and the second storage means is an endless magnetic track the reading and recording means of which are separated by a length of track equal to the length of one of the storage sections, and in which the control means includes means for causing relative motion between said tracks and both sets of reading and recording means.

8. Intelligence storage equipment, as claimed in claim 7, in which the control means includes means for recording each group of signals representing a word as a number of successive elements each of which is recorded as either one of two magnetic conditions, means for controlling the reading of each stored element at the beginning of each element time and means for controlling the recording of each element to be recorded at a position in each element time later than the reading position.

9. Intelligence storage equipment, as claimed in claim 7, in which the means for altering the operation of one of the circulating means is operated only when an alteration has been made to the stored intelligence.

10. Intelligence storage equipment comprising a first endless magnetic track on which intelligence can be stored and which provides a number of independent storage sections of equal capacity in each of which signals representing a word may be stored, first reading and recording means mounted in operative relation to said track, an interconnection between said first reading means and said first recording means, whereby a group of signals representing a word stored in a section of said first track may be repeatedly circulated, signal-by-signal, each time said section passes said first reading and recording means from said first reading means, through said interconnection, to said recording means to be recorded again in said section, a second endless magnetic track having the same number of storage sections as said first track, second reading and recording means mounted in operative relation to said second track and spaced from each other a distance equal to one storage section with the reading means leading the recording means, means for moving both tracks with respect to the associated reading and recording means in such a manner that corresponding sections of said tracks are read simultaneously by said reading means, an interconnection, including amplifying and gating means only between said second reading and recording means, whereby a group of signals representing a word stored on said second track may be maintained in circulation in the path including said second reading means, said interconnection, said second recording means, and successive sections of said second track, means for selecting one of the storage sections of said first track, and means under control of said selecting means and responsive to the simultaneous initiation of a reading of said selected storage section of said first track by the reading means thereof and the reading of the section of said second track then containing said group of signals to cause the modification of the group of signals being read by one of said reading means under control of the group of signals being read by the other of said reading means.

11. Intelligence storage equipment, as claimed in claim 10, in which said selecting means includes means to select a plurality of the storage sections, and in which the modifying means causes the modification of each group of signals being read from a selected section under control of the group of signals being read from the corresponding section of said second track.

12. Intelligence storage equipment, comprising a first store having a number of independent storage sections of equal capacity in each of which a group of signals representing a word may be stored, first reading means for successively reading the sections of said first store, first recording means for said first store, first circulating means between said first reading means and said first recording means for circulating the group of signals read from each section of said first store by said first reading means, signal-by-signal, to said first recording means for immediately rerecording it in the same section of said first store, a second store having the same storage capacity as said first store, second reading means for successively reading the sections of said second store, second recording means for said second store, second circulating means including amplifying and gating means only between said second reading means and said second recording means for immediately circulating the group of signals read from each section of said second store by said second reading means to said second recording means, signal-by-signal, for rerecording it in the section of said second store to be next read by said second reading means, means for selecting a storage section of said first store, and means under control of said selecting means and connected to said first and second circulating means and responsive to the initiation of a reading operation of said first reading means in reading the group of signals recorded in said selected section and the simultaneous reading operation of said second reading means in reading a particular group of signals then appearing in the corresponding section of said second store for altering the operation of said first circulating means to modify the group of signals read by said first reading means in accordance with the contents of the corresponding section of said second store.

13. Intelligence storage equipment comprising a first endless magnetic track having a number of separate storage sections in each of which a group of signals representing a word may be stored, first reading means operatively positioned with respect to said first track for successive reading of the groups of signals stored thereon upon relative movement between said track and reading means, first recording means operatively positioned with respect to said first track and arranged so that groups of signals may be recorded in successive sections thereon upon relative movement of said first track and first recording means, a second endless magnetic track having the same capacity as said first track, second reading means operatively positioned with respect to said second track for successive reading of the groups of signals stored therein, second recording means operatively positioned with respect to said second track and arranged so that groups of signals may be recorded in successive sections thereon upon relative movement of said second track and said second recording means, means for causing relative movement of said tracks and said respective reading and recording means at the same speed, said second recording means being spaced from said second reading means along said second track in a direction opposite to the direction of motion a distance corresponding to the space occupied by one group of signals, first circulating means including a first delay circuit interconnecting said first reading means and said first recording means, the delay of said first delay circuit being equal to the time required for a section of track to move from said first reading means to said first recording means, whereby a group of signals read by said first reading means may be circulated in said first circulating means and be rerecorded, signal-by-signal, in the same section of said first track, second circulating means including amplifying and gating means only interconnecting said second reading means and said second recording means, so that a group of signals read from a section of said second track may be circulated through said second circulating means and recorded by said second recording means in the next adjacent section of said second track following the section being read, whereby a group of signals recorded on said second track will be recorded successively in each section thereof, gate means including a second delay circuit interconnecting said first and second circulating means, the delay of said second delay circuit being equal to the time required for a section of said first magnetic track to move from said first reading means to said first recording means, control means operable at a selected predetermined time for operating said gate means to transfer a group of signals circulating in one of said circulating circuits to the other circulating circuit, whereby it is recorded on the associated track, and computing means connected to said control means and to both said circulating means and selectively operable for effecting a computation of the group of signals transferred by said gate means.

References Cited in the file of this patent

UNITED STATES PATENTS

| | | |
|---|---|---|
| 2,701,095 | Stibitz | Feb. 1, 1955 |
| 2,734,186 | Williams | Feb. 7, 1956 |
| 2,772,050 | Robinson et al. | Nov. 27, 1956 |
| 2,787,416 | Hansen | Apr. 2, 1957 |
| 2,796,218 | Tootill et al. | June 18, 1957 |
| 2,810,516 | Tootill et al. | Oct. 22, 1957 |
| 2,855,146 | Henning et al. | Oct. 7, 1958 |
| 2,901,166 | Hamilton et al. | Aug. 25, 1959 |

OTHER REFERENCES

Sharpless: Theory and Techniques for the Design of Electronic Digital Computers, vol. IV, Univ. of Pa., June 30, 1948, Lecture 47, pgs. 1 to 12 and 4 shts.

McGuigan: "Combined Reading and Writing on a Magnetic Drum," Proc. IRE, October 1953, pgs. 1438 to 1444.